United States Patent [19]
Oh

[11] Patent Number: 5,758,103
[45] Date of Patent: May 26, 1998

[54] CIRCUIT FOR REPLACING A PERIPHERAL DEVICE OF A COMPUTER SYSTEM AND METHOD THEREFOR

[75] Inventor: Jae-Choeul Oh, Suwon, Rep. of Korea

[73] Assignee: SamSung Electronics Co., Ltd., Suwon, Rep. of Korea

[21] Appl. No.: 706,436

[22] Filed: Aug. 30, 1996

[30] Foreign Application Priority Data

Aug. 31, 1995 [KR] Rep. of Korea .................. 27943/1995

[51] Int. Cl.⁶ ...................................................... G06F 13/00
[52] U.S. Cl. ...................... 395/283; 395/282; 395/182.05
[58] Field of Search ........................ 395/281–283, 395/182.03, 182.05, 835

[56] References Cited

U.S. PATENT DOCUMENTS

| | | | |
|---|---|---|---|
| 5,157,771 | 10/1992 | Losi et al. | 395/283 |
| 5,185,881 | 2/1993 | Brooks et al. | 395/182.01 |
| 5,263,152 | 11/1993 | Smith et al. | 395/182.03 |
| 5,297,067 | 3/1994 | Blackborow et al. | 364/708.1 |
| 5,333,309 | 7/1994 | Hibi | 395/182.2 |
| 5,340,340 | 8/1994 | Hastings et al. | 439/64 |
| 5,345,181 | 9/1994 | Comparetta et al. | 395/182.03 |
| 5,454,080 | 9/1995 | Fasig et al. | 395/283 |
| 5,469,565 | 11/1995 | Hibi | 395/181 |
| 5,515,515 | 5/1996 | Kennedy et al. | 395/283 |
| 5,557,739 | 9/1996 | Gupta et al. | 395/183.1 |
| 5,664,119 | 9/1997 | Jeffries et al. | 395/283 |

*Primary Examiner*—Gopal C. Ray
*Attorney, Agent, or Firm*—Robert E. Bushnell, Esq.

[57] ABSTRACT

A circuit for enabling replacement of a peripheral device connected to a main system in a computer system includes a selecting section that enables a user to select to replace the peripheral device. The replacement will occur while electrical power is being provided to the main system in a computer system. A display section provides a display indicating whether or not the peripheral device may be disconnected from the main system in a computer system. A sensing control section controls a display state of the display section in response sensing a switched state of the selecting section, and transmits corresponding signals to a central processing unit in response to sensing an operating state of the peripheral device. A transmission section selectively enables and disables transmission of interface signals between the peripheral device and the main system in a computer system in dependence upon a control signal provided from the sensing control section. The control signal is generated in response to the switched state of the selecting section.

18 Claims, 3 Drawing Sheets

CIRCUIT FOR REPLACING A PERIPHERAL DEVICE OF A COMPUTER SYSTEM AND METHOD THEREFOR

CROSS-REFERENCE TO RELATED APPLICATIONS

This application makes reference to, incorporates the same herein, and claims all benefits accruing under 35 U.S.C. §119 arising from an application for Circuit For Replacing A Peripheral Device Of A Computer System And A Method Therefor earlier filed in the Korean Industrial Property Office on 31 Aug. 1995 and there duly assigned Ser. No. 27943/1995.

BACKGROUND OF THE INVENTION

The present invention relates to a circuit and method for replacing a peripheral device of a main system in a computer system, and more particularly, to a circuit for enabling a peripheral device of a main system in a computer system to be replaced without turning off the electrical power source of the main system in a computer system.

In conventional main system in a computer systems employing peripheral equipment, such as a hard disc device (HDD), occasions arise in which the hard disc device (HDD) must be replaced. Conventionally, hard disc devices (HDDs) can not be replaced while electrical power is being supplied to the main system in a computer system since the main system in a computer system might be damaged if the power remains on while the hard disc device (HDD) is being replaced. One prior art reference that operates in this manner is U.S. Pat. No. 5,469,565 issued to Hibi. In Hibi '565, a portable computer includes a detachable hard disk pack that can be connected to and disconnected from a system bus of the computer while the computer is in a power-off state. While conventional art such as Hibi '565 provides certain benefits, such as preventing system overruns after the hard disk pack has been replaced, I note that fails it to enable a user to replace the hard disc device while the main system in a computer system is being supplied with power. Accordingly, a disadvantage results in that the main system in a computer system must be re-booted after the hard disc device is replaced.

SUMMARY OF THE INVENTION

Therefore, it is an object of the present invention to provide a circuit and method capable of overcoming the foregoing problems of the prior art.

It is another object to provide a circuit and a method for replacing a peripheral device in a main system in a computer system without turning off the power to the main system in a computer system.

It is yet another object to provide an improved computer system.

To achieve these and other objects, the present invention provides a circuit for enabling replacement of a peripheral device connected to a main system in a computer system. The circuit includes a selecting section that enables a user to select to replace the peripheral device. The replacement will occur while electrical power is being provided to the main system in a computer system. A display section provides a display indicating whether or not the peripheral device may be disconnected from the main system in a computer system. A sensing control section controls a display state of the display section in response to sensing a switched state of the selecting section, and transmits corresponding signals to a central processing unit in response to sensing an operating state of the peripheral device. A transmission section selectively enables and disables transmission of interface signals between the peripheral device and the main system in a computer system in dependence upon a control signal provided from the sensing control section. The control signal is generated in response to the switched state of the selecting section.

The present invention further provides a method for replacing a peripheral device in a main system in a computer system. The method contemplates generating a system management interrupt signal during operation of the main system in a computer system; determining whether the system management interrupt signal is related to the peripheral device, and receiving data from a microcomputer when the system management interrupt signal is related to the peripheral device; executing a procedure relating to the system management interrupt signal when the system management interrupt signal is not related to the peripheral device; determining whether the data received from the microcomputer indicates that the peripheral device is being replaced, and disabling the peripheral device when the data indicates that the peripheral device is being replaced; determining whether the peripheral device is operable when the data indicates that the peripheral device is not being replaced; reading parameters pertaining to the peripheral device when the peripheral device is operable; setting up a parameter table for the peripheral device after reading the parameters; and initializing the peripheral device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
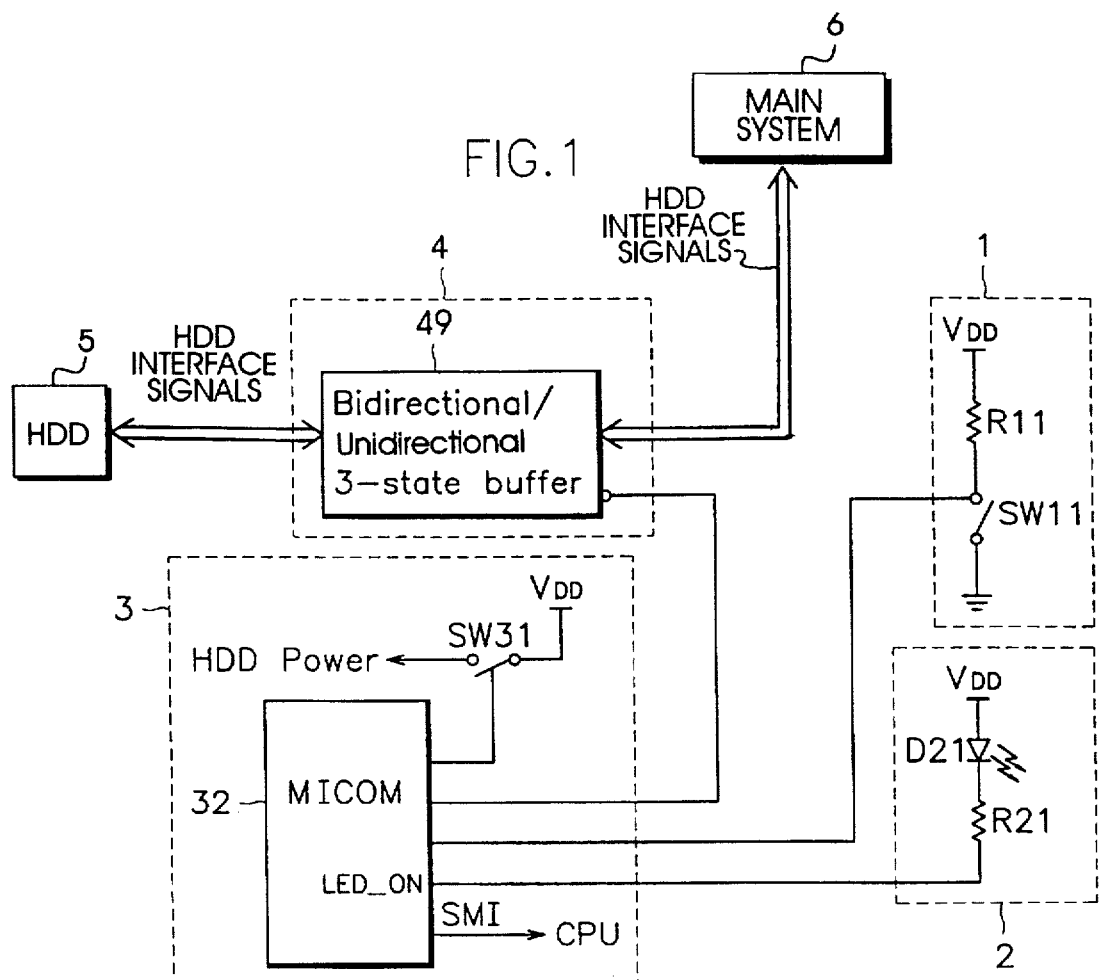
FIG. 1 is a circuit for enabling replacement of a hard disc device (HDD) according to the principles of the present invention.

Turning now to drawings and referring to FIG. 1, a circuit for enabling replacement of a peripheral device according to the principles of the present invention is shown. In the following description, the peripheral device is exemplified by a hard disc device (HDD). The circuit of FIG. 1 includes a selecting section 1 for enabling a user to replace a hard disc device (HDD) 5 after manipulating a switch. A display section 2 provides a display to indicate whether or not the hard disc device (HDD) 5 can be replaced. A sensing control section 3 controls an operating, state of display section 2 by sensing the state of selecting section 1, and transmits corresponding signals to a central processing unit after sensing an operating state of the hard disc device (HDD) 5. A transmission section 4 enables and disables transmission of hard disc device (HDD) interface signals between hard disc device (HDD) 5 and a main system in a computer system 6 according to the operation of sensing control section 3.

Selecting section 1 includes a first resistor R11 connected between a first terminal of a first switch SW11 and an external power source. A second terminal of first switch SW11 is connected to a ground potential. Display section 2 includes a light emitting diode D21 having an anode connected to an external power source. A second resistor R21 has a first terminal connected to a cathode of light emitting diode D21 and a second terminal connected to sensinly control section 3.

Sensing control section 3 includes a microcomputer 32 which senses the switching state of selecting section 1, and controls the operation of transmission section 4 and light emitting diode D21 of display section 2. A second switch SW31 has a first terminal connected to an external power source VDD, and a second terminal connected to a power input terminal (not shown) of hard disc device (HDD) 5. A third terminal of second switch SW31 is connected to microcomputer 32.

Transmission section 4 is constructed with a bidirectional/ unidirectional 3-state buffer 49 which is operated in response to control signals received from sensing control section 3, and enables and disables transmission of hard disc device (HDD) interface signals between the hard disc device (HDD) 5 and the main system in a computer system 6.

The operation of the circuit of the present invention will now be described with reference to FIGS. 1 through 5.

Figure 4:
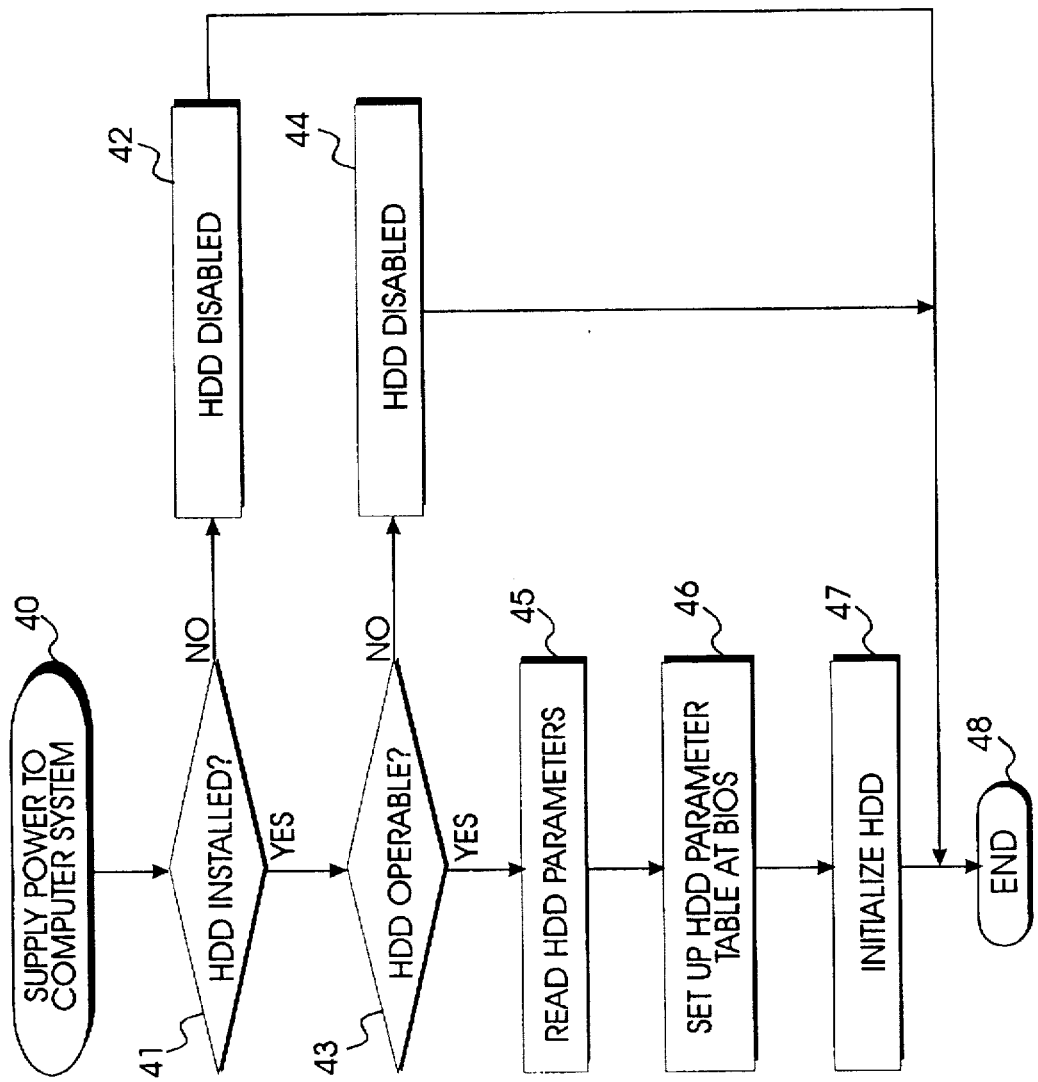
FIG. 4 is a flow chart for the circuit of the FIG. 1 showing a self-diagnosis procedure performed after an initial supply of electrical power is delivered to the main system in a computer system.

Referring to FIG. 4, a flow chart for the circuit of the FIG. 1 showing a self-diagnosis procedure performed after an initial supply of electrical power is delivered to the main system in a computer system is shown. According to the self-diagnosis procedure of FIG. 4, electrical power is supplied to the main system in a computer system 6, in step 40. After electrical power has been supplied to the main system in a computer system 6, the basic input/output system (BIOS) determines whether the hard disc device (HDD) 5 has been installed, in step 41. If the hard disc device (HDD) 5 has not been installed, the hard disc device (HDD) 5 is deemed to be in a disabled state, in step 42. Alternatively, if the hard disc device (HDD) 5 has been installed in step 41, the basic input/output system (BIOS) determines whether the hard disc device (HDD) 5 is operable, in step 43. If the hard disc device (HDD) 5 is not operable, the hard disc device (HDD) 5 is deemed to be in a disabled state, in step 44. Alternatively, if the hard disc device (HDD) 5 is determined to be operable in step 43, the basic input/output system (BIOS) reads various parameters relating to the hard disc device (HDD) 5, in step 45. Then, in step 46, a hard disc device (HDD) parameter table is set up at the basic input/output system (BIOS). The hard disc device (HDD) 5 is initialized, in step 47, and the procedure thereafter ends at step 48.

In the state in which electrical power is supplied to the main system in a computer system 6, first switch SW11 can be switched on when a user desires to remove and/or replace the hard disc device (HDD) 5. Once first switch SW11 is switched on, microcomputer 32 senses this condition and responds by controlling bidirectional/unidirectional 3-state buffer 49 to disable transmission of the hard disc device (HDD) interface signals between the hard disc device (HDD) 5 and the main system in a computer system 6. Microcomputer 32 also switches second switch SW31 to an off state to interrupt the supply of electrical power to hard disc device (HDD) 5, and turns on light emitting diode D21 to thereby inform the user that the hard disc device (HDD) 5 can now be separated from main system in a computer system 6.

Once the user removes hard disc device (HDD) 5, microcomputer 32 informs the central processing unit through a system management interrupt (SMI) signal that hard disc device (HDD) 5 has been removed from the main system in a computer system 6.

Figure 2:
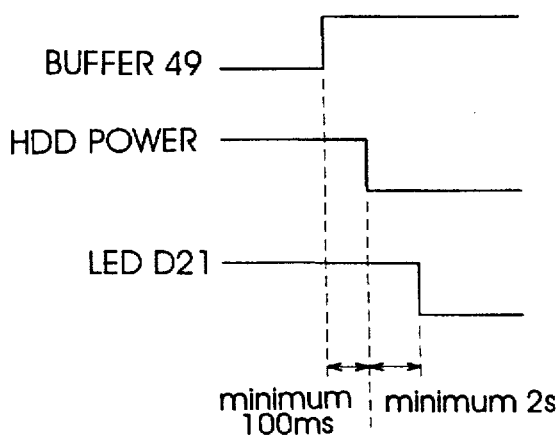
FIG. 2 is a timing chart for the circuit of FIG. 1 showing the state in which electrical power provided to the hard disc device (HDD) is interrupted for making it possible to replace the hard disc device (HDD) in a main system in a computer system to which electrical power is supplied.

FIG. 2 is a timing chart showing the state in which electrical power provided to the hard disc device (HDD) 5 is interrupted for making it possible to replace the hard disc device (HDD) 5. According to FIG. 2, after bidirectional/ unidirectional 3-state buffer 49 is controlled to disable transmission of the hard disc device (HDD) interface signals between hard disc device (HDD) 5 and the main system in a computer system 6, it takes at least 100 milliseconds to interrupt the supply of electrical power to the hard disc device (HDD) 5. Then, once the supply of electrical power is interrupted, it takes at least another two seconds for light emitting diode D21 to achieve an on-state. Note that light emitting diode D21 shifts to the on-state via a logic "LO" signal output from microcomputer 32.

After the hard disc device (HDD) 5 has been separated from main system in a computer system 6 and replaced with a new one, first switch SW11 is switched off to indicate that the replacement has been completed. Microcomputer 32 senses this condition, and responds by turning off light emitting diode D21, and turning on second switch SW31 to resume the supply of electrical power to the hard disc device (HDD) 5. Microcomputer 32 also informs the central processing unit through the system management interrupt (SMI) signal that the new hard disc device (HDD) 5 has been connected to the main system in a computer system 6.

Figure 3:
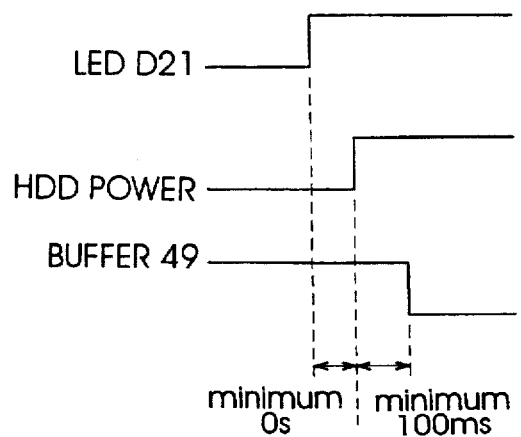
FIG. 3 is a timing chart for the circuit of FIG. 1 showing the state in which electrical power is provided to the hard disc device (HDD) in a main system in a computer system to which electrical power is supplied.

FIG. 3 is a timing chart showing the state in which electrical power is provided to the hard disc device (HDD) 5 after the replacement has been completed. According to FIG. 3, the light emitting diode D21 of display section 2 is first shifted to an off state via a logic "HI" signal output from microcomputer 32. Thereafter, it takes at least zero milliseconds to resume the supply of electrical power to the hard disc device (HDD) 5. After the supply of electrical power to hard disc device (HDD) is resumed, it takes at least another 100 milliseconds to control bidirectional/unidirectional 3-state buffer 49 and thereby re-establish transmission of the hard disc device (HDD interface signals between hard disc device (HDD) 5 and main system in a computer system 6.

Figure 5:
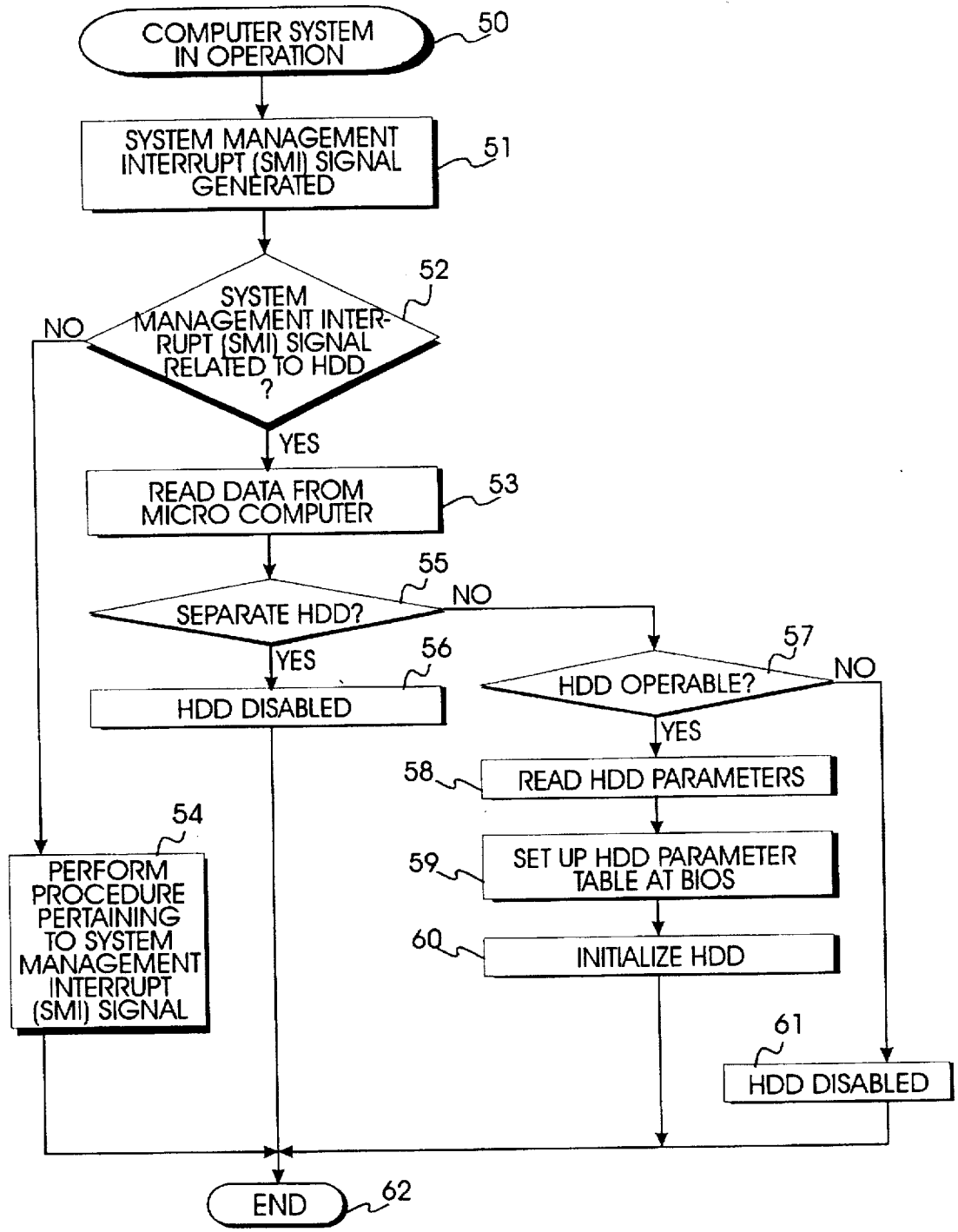
FIG. 5 is a flow chart for the circuit of FIG. 1 showing a procedure performed in response to generation of a system management interrupt (SMI) signal.

The central processing unit receives the system management interrupt (SMI) signal generated from microcomputer 32, and executes a system management interrupt (SMI) procedure. FIG. 5 is a flow chart showing the system management interrupt (SMI) procedure performed in response to generation of the system management interrupt (SMI) signal.

In step 50, the main system in a computer system 6 is in operation. While the main system in a computer system 6 is in operation, the system management interrupt (SMI) signal is generated by microcomputer 32, in step 51. In step 52, the central processing unit determines whether the system management interrupt (SMI) signal is related to the hard disc device (HDD) 5. If the system management interrupt (SMI) signal is not related to the hard disc device (HDD) 5, a procedure pertaining to the system management interrupt (SMI) signal is performed, in step 54. Alternatively, if the system managnement interrupt (SMI) signal is related to the hard disc device (HDD) 5, the central processing unit reads data from microcomputer 32, in step 53, and then determines whether the read data indicates that the hard disc device (HDD) 5 is being separated from the main system in a computer system 6 in step 55. If the read data indicates that the hard disc device (HDD) 5 is being separated from the main system in a computer system 6, the hard disc device (HDD) 5 is disabled in step 56, and the procedure ends at step 62.

Alternatively, if the read data indicates that the hard disc device (HDD) 5 is not being separated from the main system in a computer system 6 in step 55, central processing unit proceeds to step 57 and determines whether the hard disc device (HDD) 5 is operable. If the hard disc device (HDD) 5 is not determined to be operable, the hard disc device (HDD) 5 is deemed to be disabled in step 61, and the procedure ends in step 62. On the other hand, if the hard disc device (HDD) 5 is determined to be operable in step 57, the central processing unit reads various parameters pertaining to the hard disc device (HDD) 5, in step 58. A hard disc device (HDD) parameter table is then set up at the basic input/output operating system (BIOS), in step 59. Thereafter, the hard disc device (HDD) 5 is initialized in step 60, and the procedure ends in step 62.

In the foregoing detailed description, the principles of the present invention are not limited to only a hard disc drive, but can also be applied to other peripheral devices, such as an optical disc drive and a floppy disc drive. Moreover, the present invention can likewise be applied to all types of main system in a computer systems, such as notebook computers, subnotebook computers, hand-held computers, etc.

According to the present invention, when replacing a peripheral device in a main system in a computer system, the peripheral device can be replaced without interrupting, the supply of electrical power to the main system in a computer system, and the main system in a computer system can be continuously used without re-booting the computer. Therefore, each time the peripheral device is replaced, the time for performing self-diagnosis and the time for re-booting can be saved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A circuit for enabling replacement of a peripheral device connected to a main system in a computer system, said circuit comprising:

a selecting section for replacing said peripheral device, the replacement to occur while electrical power is being provided to said main system;

a display section for providing a display indicating whether or not disconnection of said peripheral device from said main system is permissible;

a sensing control section for controlling a display state of said display section in response to sensing a switched state of said selecting section, and transmitting corresponding signals to a central processing unit in response to sensing an operating state of said peripheral device; and a transmission section for selectively enabling and disabling transmission of interface signals between said peripheral device and said main system in dependence upon a control signal provided from said sensing control section, said control signal being generated in response to said switched state of said selecting section.

2. The circuit as claimed in claim 1, wherein said peripheral device comprises one of a hard disc drive, an optical disc drive, and a floppy disc drive.

3. The circuit as claimed in claim 1, wherein said selecting section comprises a first switch that exhibits a first switched state when the user selects to replace said peripheral device, and a second switched state when the user does not select to replace said peripheral device.

4. The circuit as claimed in claim 3, wherein said peripheral device comprises one of a hard disc drive, an optical disc drive, and a floppy disc drive.

5. The circuit as claimed in claim 1, wherein said sensing control section comprises:

a microcomputer connected to said selecting section for controlling said display section and said transmission section in response to said switched state of said selecting section; and a power switch controlled by said microcomputer for selectively enabling and disabling transmission of electrical power to said peripheral device in response to said switched state of said selecting section.

6. The circuit as claimed in claim 5, wherein said power switch disables the transmission of electrical power to said peripheral device when said selecting section exhibits a first switched state indicating that the user selects to replace said peripheral device, and enables the transmission of electrical power to said peripheral device when said selecting section exhibits a second switched state indicating that the user does not select to replace said peripheral device.

7. The circuit as claimed in claim 6, wherein said peripheral device comprises one of a hard disc drive, an optical disc drive, and a floppy disc drive.

8. The circuit as claimed in claim 1, wherein said display section comprises a light emitting diode that exhibits a first display state to indicate that disconnection of said peripheral device from said main system is permissible, and a second display state different from said first display state to indicate that disconnection of said peripheral device from said main system is not permissible.

9. The circuit as claimed in claim 8, wherein said light emitting diode exhibits said first display state when said selecting section exhibits a first switched state indicating that the user selects to replace said peripheral device, and exhibits said second display state when said selecting section exhibits a second switched state indicating that the user does not select to replace said peripheral device.

10. The circuit as claimed in claim 9, wherein said peripheral device comprises one of a hard disc drive, an optical disc drive, and a floppy disc drive.

11. The circuit as claimed in claim 1, wherein said transmission section comprises a tri-state buffer that selectively enables and disables transmission of said interface signals between said peripheral device and said main system in dependence upon said switched state of said selection section.

12. The circuit as claimed in claim 11, wherein said tri-state buffer disables the transmission of said interface signals between said peripheral device and said main system when said selecting section exhibits a first switched state indicating that the user selects to replace said peripheral device, and enables the transmission of said interface signals between said peripheral device and said main system when said selecting section exhibits a second switched state indicating that the user does not select to replace said peripheral device.

13. The circuit as claimed in claim 12, wherein said peripheral device comprises one of a hard disc drive, an optical disc drive, and a floppy disc drive.

14. A method for replacing a peripheral device in a computer system, comprising the steps of:

generating a system management interrupt signal during operation of a main system in said computer system;

determining whether said system management interrupt signal is related to said peripheral device, and receiving data from a microcomputer when said system management interrupt signal is related to said peripheral device;

executing a procedure relating to said system management interrupt signal when said system management interrupt signal is not related to said peripheral device;

determining whether the data received from said microcomputer indicates that said peripheral device is being replaced, and disabling said peripheral device when the data indicates that said peripheral device is being replaced;

determining whether said peripheral device is operable when the data indicates that said peripheral device is not being replaced;

reading parameters pertaining to said peripheral device when said peripheral device is operable;

setting up a parameter table for said peripheral device after reading said parameters; and initializing said peripheral device.

15. The method as claimed in claim 14, wherein said peripheral device comprises one of a hard disc drive, an optical disc drive, and a floppy disc drive.

16. A computer system, comprising:

a main system;

a peripheral device;

a selecting section for replacing said peripheral device while electrical power is being provided to said main system, said selecting section exhibiting a first switched state when the user selects to replace said peripheral device, and exhibiting a second switched state when the user does not select to replace said peripheral device;

a display section for exhibiting a first display state to indicate that disconnection of said peripheral device from said main system is permissible when said selecting section exhibits said first switched state, and exhibiting a second display state different from said first display state to indicate that disconnection of said peripheral device from said main system is not permissible when said selecting section exhibits said second switched state;

a transmission section for disabling transmission of interface signals between said peripheral device and said main system when said selecting section exhibits said first switched state, and enabling transmission of said interface signals between said peripheral device and said main system when said selecting section exhibits said second switched state; and a sensing control section connected to said selecting section for detecting said first and second switched states, and for controlling said display section and said transmission section in response to the detection of said first and second switched states.

17. The system as claimed in claim 16, wherein said peripheral device comprises one of a hard disc drive, an optical disc drive, and a floppy disc drive.

18. The system as claimed in claim 16, wherein said sensing control section disables transmission of electrical power to said peripheral device when said selecting section exhibits said first switched state, and enables transmission of electrical power to said peripheral device when said selecting section exhibits said second switched state.

* * * * *